UNITED STATES PATENT OFFICE.

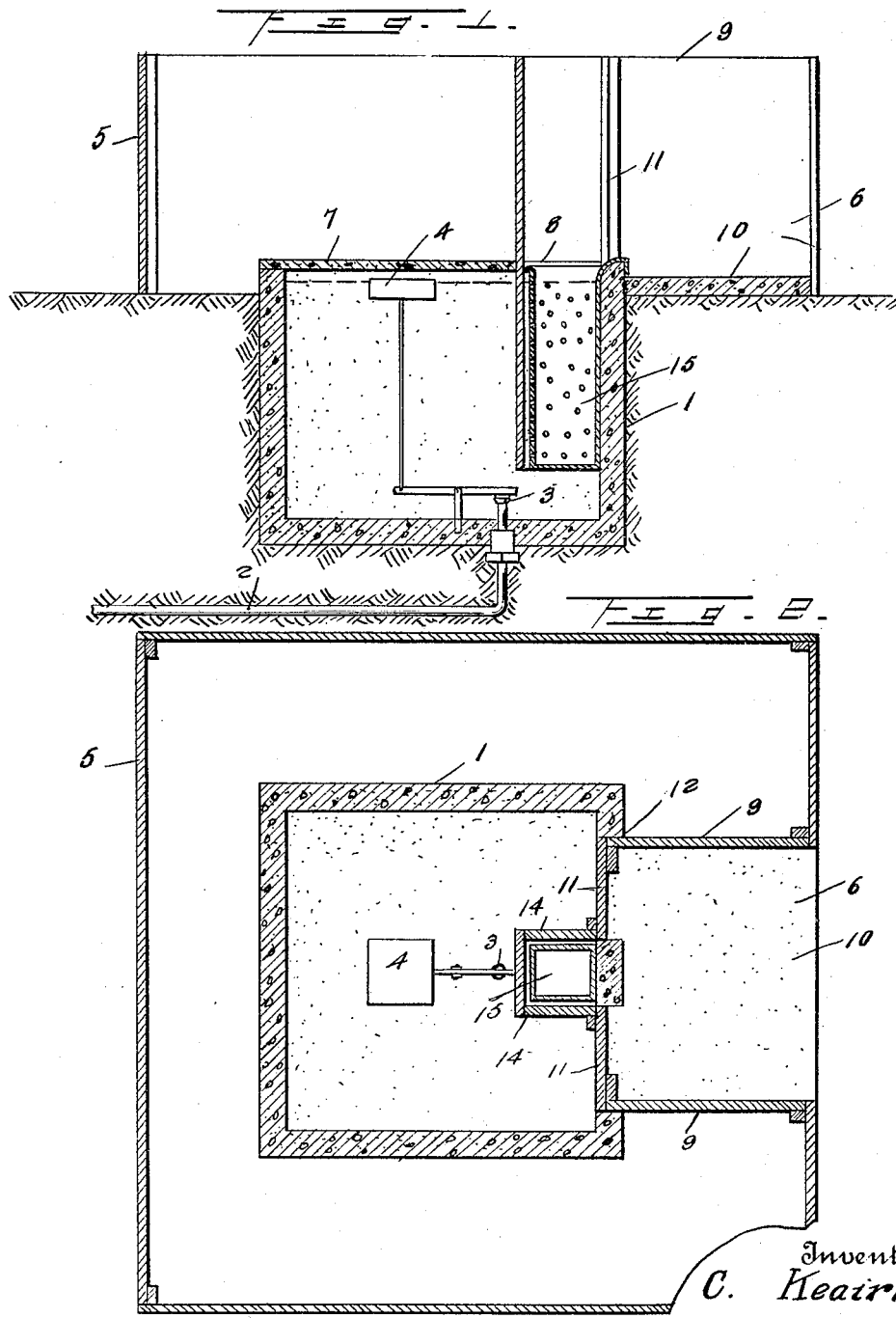

CORNELIUS KEAIRNES, OF MAPLETON, IOWA.

DEVICE FOR WATERING HOGS.

1,325,474.  Specification of Letters Patent.  Patented Dec. 16, 1919.

Application filed July 11, 1919. Serial No. 310,016.

*To all whom it may concern:*

Be it known that I, CORNELIUS KEAIRNES, a citizen of the United States, residing at Mapleton, in the county of Monona and State of Iowa, have invented certain new and useful Improvements in Devices for Watering Hogs; and I do hereby declare the following to be a full, clear, and exact description of the invention, such as will enable others skilled in the art to which it appertains to make and use the same.

This invention relates to new and useful improvements in devices for watering hogs or other live stock and has for one of its objects the provision of a device of this character which will be automatic in its operation and which is practically indestructible and also will keep the water at an even temperature without the use of auxiliary heating means.

Another object of this invention is the provision of means which is accessible to the live stock when desiring to drink water and which will keep the water in a sanitary condition.

A further object of this invention is the provision of a device for watering hogs or live stock of the above stated character which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a vertical sectional view of a device for watering hogs or live stock constructed in accordance with my invention, Fig. 2 is a horizontal sectional view of the same, Referring in detail to the drawing, the numeral 1 indicates a tank constructed of cement or any other material suitable for the purpose and is adapted to be embedded within the ground as clearly illustrated in Fig. 1, and is provided with a stuffing box in its bottom wall to receive a water supply pipe 2.

The water supply pipe 2 is adapted to be connected to a water source and has its end disposed within the tank 1 provided with a valve 3 that is controlled by a float 4 so that an even amount of water will be kept in the tank 1 at all times.

A wall 5 of any material suitable for the purpose is constructed around the tank 1 in spaced relation thereto and upon the surface of the ground and is provided with a door or entrance way 6 in one of its walls. The tank 1 is closed by a concrete slab or cover 7 which is provided with an opening 8 at a point adjacent the doorway 6. The space occurring between the tank and the wall 5 is filled with straw or other similar material for keeping the water within the tank 1 at an even temperature. Inwardly directed walls 9 lead from the doorway or entrance 6 to the tank 1 and have located between the same a platform 10 constructed of cement or any other material suitable for the purpose. The inwardly directed walls 9 are connected to walls 11 located within the cut-out portion 12 of the tank 1 and which are connected to partition walls 14. The partition walls 14 extend downwardly within the opening 8 of the cover 7 and terminate at a point spaced from the bottom wall of the tank 1. A perforated receptacle 15 is supported within the partition wall and downwardly within the tank 1 so that water within the tank may pass upwardly within the receptacle 15 to be drunk by the hogs or live stock standing upon the platform 10. The receptacle 15 is removable so that any dirt and foreign matter caught therein can be readily removed by taking the receptacle 15 out of the partition walls and cleansing the same. It will therefore be seen that dirt and foreign matter conveyed by the live stock will be prevented from falling into the tank 1, thus keeping the water in a sanitary condition.

While I have shown and described the preferred embodiment of my invention, it will be understood that minor changes in construction, combination, and arrangement of parts may be made without departing from the spirit and scope of the invention as claimed.

Having thus described my invention, what I claim is:—

A device for watering live stock comprising a tank, a wall partially surrounding said tank, means supplying water to the tank, a cover for said tank and having an opening therein, said wall having an entrance way, inwardly extending spaced walls leading from the entrance way to the tank, partition walls extending through the opening in the cover to a point adjacent the bottom of the tank and having their upper ends terminating flush with the upper edge of the wall, and a platform within said entrance way.

In testimony whereof I affix my signature.

CORNELIUS KEAIRNES.